United States Patent
Yu et al.

(10) Patent No.: US 7,799,475 B2
(45) Date of Patent: Sep. 21, 2010

(54) METHOD OF USING $H_2$ PURGE FOR STACK STARTUP/SHUTDOWN TO IMPROVE STACK DURABILITY

(75) Inventors: Paul Taichiang Yu, Pittsford, NY (US); Frederick T Wagner, Fairport, NY (US)

(73) Assignee: GM Global Technology Operations, Inc.

( * ) Notice: Subject to any disclaimer, the term of this patent is extended or adjusted under 35 U.S.C. 154(b) by 1140 days.

(21) Appl. No.: 10/927,348

(22) Filed: Aug. 26, 2004

(65) Prior Publication Data

US 2006/0046106 A1    Mar. 2, 2006

(51) Int. Cl.
    *H01M 8/04* (2006.01)
(52) U.S. Cl. .................. 429/429; 429/428; 429/444
(58) Field of Classification Search ............. 429/12–47, 429/428, 429, 444
    See application file for complete search history.

(56) References Cited

U.S. PATENT DOCUMENTS

| | | | |
|---|---|---|---|
| 6,399,231 | B1 | 6/2002 | Donahue et al. |
| 2002/0076583 | A1* | 6/2002 | Reiser et al. ................. 429/13 |
| 2003/0134164 | A1 | 7/2003 | Reiser et al. |
| 2004/0126628 | A1* | 7/2004 | Balliet et al. ................. 429/13 |
| 2005/0031917 | A1* | 2/2005 | Margiott et al. ............... 429/17 |
| 2005/0058860 | A1* | 3/2005 | Goebel ........................ 429/17 |

FOREIGN PATENT DOCUMENTS

DE    101 96 359    7/2003

\* cited by examiner

*Primary Examiner*—Dah-Wei D Yuan
*Assistant Examiner*—Zachary Best
(74) *Attorney, Agent, or Firm*—Harness, Dickey & Pierce, P.L.C.

(57) ABSTRACT

A method of fuel cell shutdown and start-up is provided. The method of shutdown includes introducing hydrogen gas into the cathode passages to purge a cathode gas from the cathode passages, then introducing air through the cathode and anode passages to remove water droplets and vapor from the fuel cell stacks. The method from fuel cell start-up includes introducing hydrogen gas into the anode and cathode passages to consume/purge oxygen in both the anode and cathode passages, and then introducing a cathode gas into the cathode passages. The introduction of hydrogen into the cathode passages in both the shutdown and start-up procedures allow a rapid draw down of the anode/cathode open circuit voltage and avoids providing a hydrogen/air front while the cathode is filled with air.

2 Claims, 3 Drawing Sheets

METHOD OF USING H₂ PURGE FOR STACK STARTUP/SHUTDOWN TO IMPROVE STACK DURABILITY

FIELD OF THE INVENTION

The present invention relates to fuel cells, and more particularly, to a method of fuel cell shutdown and start-up.

BACKGROUND OF THE INVENTION

Fuel cells have been used as a power source in many applications. For example, fuel cells have been proposed for use in electrical vehicular power plants to replace internal combustion engines. In proton exchange membrane (PEM) type fuel cells, hydrogen is supplied to the anode of the fuel cell and oxygen is supplied as the oxidant to the cathode. PEM fuel cells include a membrane electrode assembly (MEA) comprising a thin, proton transmissive, non-electrically conductive, solid polymer electrolyte membrane having the anode catalyst on one face and the cathode catalyst on the opposite face. The MEA is sandwiched between a pair of non-porous, electrically conductive elements or plates which serve as current collectors for the anode and cathode, and contain appropriate channels and/or openings formed therein for distributing the fuel cell's gaseous reactants over the surfaces of the respective anode and cathode catalysts.

The electrically conductive plates sandwiching the MEAs may contain an array of grooves in the faces thereof that define a reactant flow field for distributing the fuel cell's gaseous reactant's (i.e., hydrogen and oxygen in the form of air) over the surfaces of the respective cathode and anode. These reactant flow fields generally include a plurality of lands that define a plurality of flow channels or passages therebetween through which the gaseous reactants flow from a supply header at one end of the flow channels to an exhaust header at the opposite end of the flow channels.

Typical start-up and shutdown procedures for a fuel cell stack have included at start-up, introducing hydrogen gas to the previously purged anode passages and providing an oxidant, such as air, to the cathode passages. At shutdown, the supply of hydrogen to the anode passages is ceased and an oxidant, such as air, is used to purge the remaining hydrogen from the anode flow passages so that the fuel cell is unable to generate electricity. The oxidant introduced to the anode passages also removes any remaining build-up of water that is in the flow passages in order to prevent freezing of the water during shutdown. In addition, an oxidant is also used to purge the cathode passages, similarly to remove any additional moisture from the passages. Recently, it has been determined that MEA degradation can occur due to this start-up and shutdown procedure.

Without intending to be limited by theory, it is believed that the major reason for degradation of the MEA is due to the diffusion of air into the anode side forming an H₂/air front while the cathode passages are still filled with air. With the presence of the H₂/air front at the anode, it results in a short circuited fuel-cell between the H₂/air front that generates ion current through the high lateral ionic resistance of membrane producing a significant lateral potential drop in the membrane. This lateral potential drop causes a cathode potential of 1.5 volts versus the local electrolyte. This elevated cathode potential results in corrosion of the carbon support material in a cathode catalyst causing significantly irreversible cell performance degradation. The cell performance degradation is illustrated in FIG. 3 which shows a graph of these cells voltage decrease over 200 cycles of the fuel cell stack, each cycle including a start-up and shutdown of the fuel cell stack. A cell voltage represented by line 100 is shown to decrease from 0.8 volts at the start to approximately 0.7 volts after 200 cycles. The reduction in the cell voltage over the 200 cycle period clearly indicates that the cell degraded over the 200 cycle test time.

SUMMARY OF THE INVENTION

The present invention includes a method of shutting down the fuel cell stack using H₂ gas to purge through the cathode passages with very short purge time to quickly draw down the anode/cathode open circuit voltage (OCV) and then followed by an air purge through both the anode and cathode side. The main purpose for the H₂ purge is to draw down the anode/cathode OCV and to avoid an H₂/air front while the cathode is filled with air. At start-up, after the stack had previously been shut down by a final purge of cathode gas into the anode and cathode passages, H₂ gas is introduced into the anode and cathode passages to consume/purge the O₂ in both the anode and cathode passages. The cathode gas is then introduced into the cathode passages in order to institute start-up of the fuel cell stack. The start-up and shutdown process of the present invention reduces the fuel cell degradation problem. The H₂ purge at shutdown drives the cathode potential down very fast which protects the stack from damage during the subsequent purge of the stack with air.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
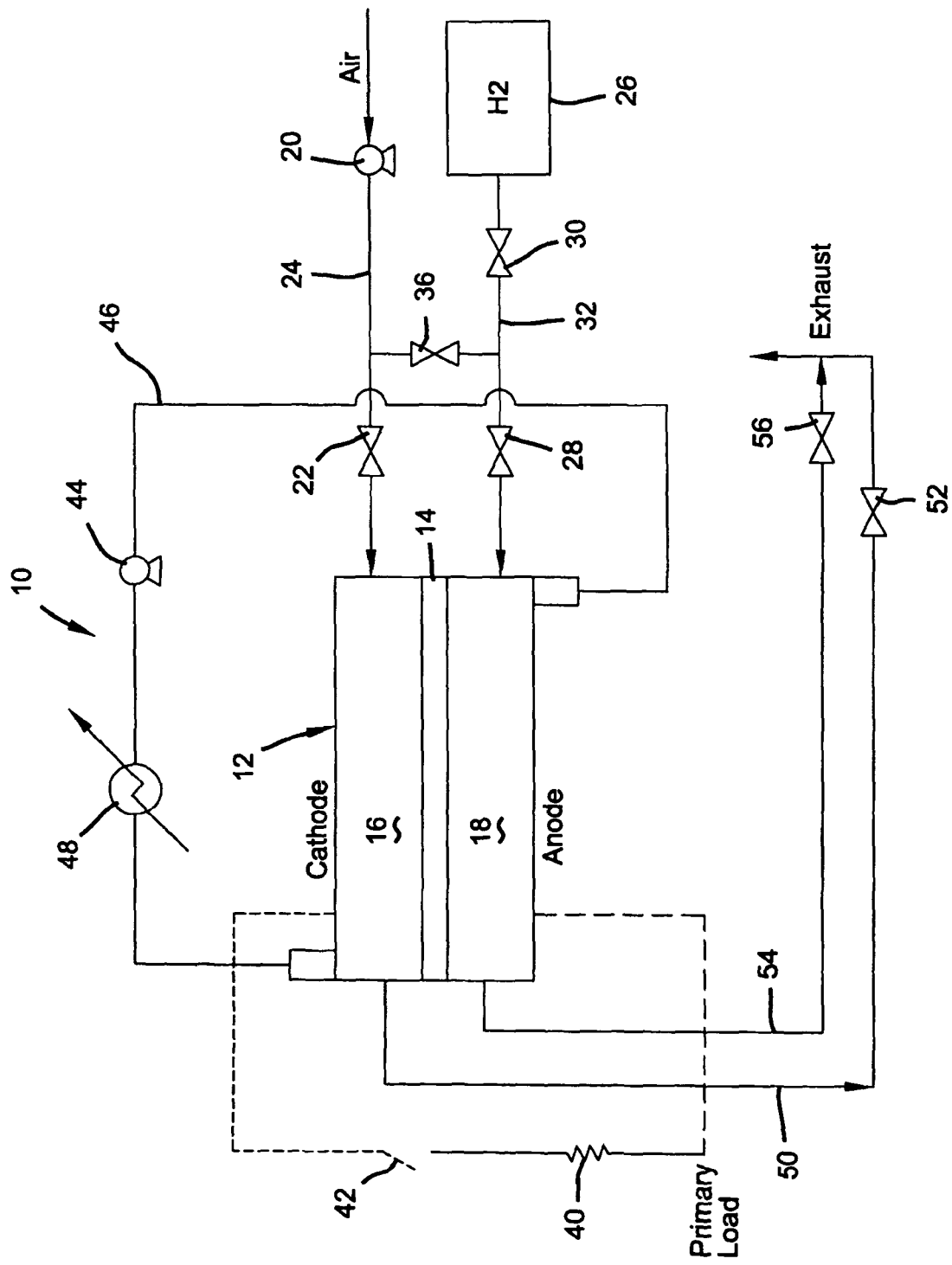
FIG. 1 is a schematic flow diagram of a start-up/shutdown procedure for a fuel cell stack.

With reference to FIG. 1, the fuel cell system 10, according to the principles of the present invention, will now be described. The system 10 includes a fuel cell stack 12 (shown schematically) including at least one membrane electrode assembly (MEA) 14 disposed between cathode passages 16 on one side thereof and anode passages 18 on a second side thereof. A compressor 20 provides air to the cathode passages 16 via valve 22 provided in air line 24. A source of hydrogen (H₂) 26 provides hydrogen to the anode passages 18 via valves 28, 30 provided in H₂ supply line 32. An air purge valve 36 is provided between air line 24 and hydrogen supply line 32.

The fuel cell stack 12 provides electricity to a primary load 40 via control switch 42. A coolant system is provided including a pump 44 provided in coolant passage 46 which connects with coolant flow passages within the fuel cell stack 12. The coolant passage 46 is provided with a heat transfer reservoir 48 for removing heat from the coolant that is used to cool the fuel cell stack 12. The cathode passages 16 are provided with an exhaust passage 50 with a valve 52 disposed therein. The anode passages 18 are provided with an exhaust passage 54 which is provided with a valve 56.

During normal operation, the valves 22, 28, 30, and 52 are open and valve 36 is closed so that air is provided to the cathode passages 16 from the compressor 20 and hydrogen gas is provided to the anode passages 18 through valves 28, 30. The purge valve 36 is closed so that no air is introduced to the anode passages 18. Valve 56 is normally closed, but is opened for nitrogen that crosses over from the cathode to the anode for allowing the nitrogen to burp out. During the normal operation, the pump 44 is on for providing coolant to the stack 12, and the compressor 20 is on for providing air to the cathode. When the stack is steady, the switch 42 is closed for delivering electricity to the primary load.

During stack shutdown, the switch 42 is opened and the compressor 20 and pump 44 are turned off. The purge valve 36 is opened and valve 28 is closed. This allows hydrogen gas to flow through the valve 36 to the cathode passages 16 and consume or purge the air in the cathode to drive the open circuit voltage (OCV) down to ground level. The hydrogen flow rate is determined by the cathode flow field volume and the purge time. The purge time should be as short as possible in order to save H₂ fuel and avoid membrane dry out. By way of example, assuming the cathode flow field volume is 19.6 cm³/cell, the purge time is 20 seconds, and the level of oxygen is 21 percent in the air, then the flow rate should be around 49-123 cm³/min-cell (2-5 times the stoichiometry of H₂ required to consume the O₂ in a cathode). The main purpose of the H₂ purge is to quickly draw down the open circuit voltage close to ground level. After the purge time has expired, the valve 30 is closed and valve 28 and 56 are opened while the compressor 20 is turned on. This allows purge air to both the anode and cathode passages 18, 16 simultaneously. The introduction of air purges all the water vapor and liquid out of the stack for preventing stack freeze. The duration of the air flow through the anode and cathode passages should be sufficient to remove the water vapor and liquid, but leave the membrane 14 with a predetermined amount of humidity.

When the fuel cell stack 12 is subsequently started up, the valves 22, 28, 36, 52, and 30 are all opened and valve 56 is closed. Hydrogen gas is then purged through the anode and cathode passages 18, 16. The duration of the purge and flow rate should be sufficient to supply about 2-5 times the stoichiometry of hydrogen required to consume the oxygen in both the anode and cathode passages. For example, assuming the flow rate is about 138-345 cm³/min-cell for the anode and 197-493 cm³/min-cell for the cathode. The time period for providing 2-5 times the stoichiometry of hydrogen required to consume the oxygen in both the anode and cathode passages 18, 16 is approximately 5 seconds. Accordingly, after the purge time period, the valve 36 is closed and the compressor 20 is turned on allowing air to flow through the cathode passages 16 while H₂ is still provided through the anode passages 18 via valves 28, 30 provided in H₂ supply line 32. When the stack is ready to generate power, the switch 42 is closed to provide electricity to the primary load 40. It is noted that for effective control, the valve 22, 28, and 36 should be placed as close as possible to the stack inlets. It should further be understood that the above exemplary calculations with regard to flow rate and purge time are based upon specific fuel cell stack configurations and would vary for differing stack configurations.

Figure 2:
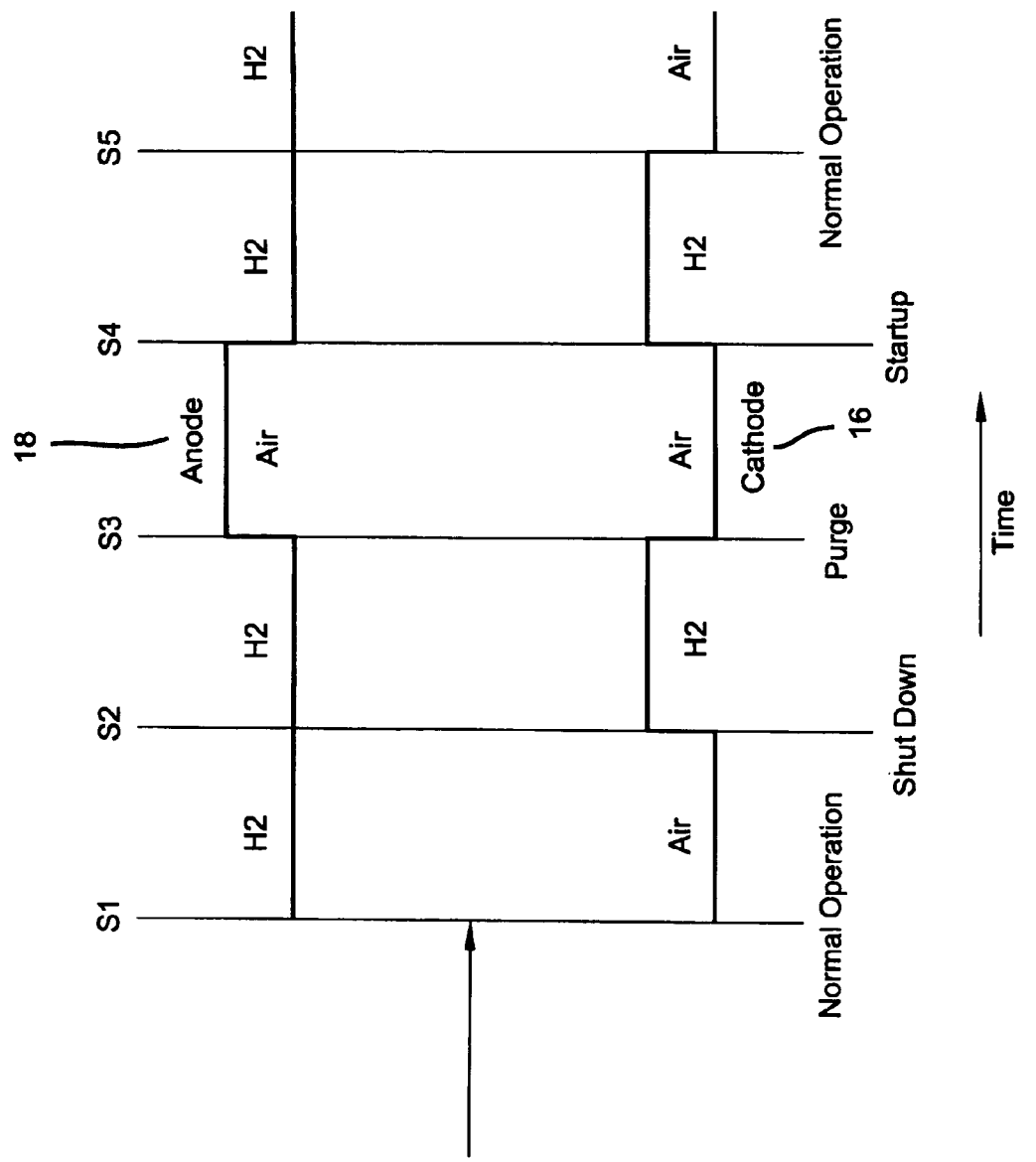
FIG. 2 is a time chart showing the introduction of hydrogen and air to the anode and cathode passages during normal operation, shutdown and start-up of the fuel cell stack according to the principles of the present invention.

With reference to FIG. 2, a summary of the above-described shutdown and start-up procedures will now be discussed. During normal operation at stage S1, hydrogen is provided to the anode passages 18 and air is provided to the cathode passages 16. As shutdown, as illustrated by Step S2, hydrogen continues to be supplied to the anode passages 18 and is also introduced to the cathode passages 16. At Step S3, both the anode and cathode passages 18, 16 are purged with air in order to complete the shutdown operation. At a subsequent start-up, as shown at Step S4, hydrogen is supplied to both the anode and cathode passages 18, 16 in order to purge all air from the anode and cathode passages 18, 16. Then, to commence normal operation at Step 5, the cathode passages 16 are provided with air while the anode passages 18 continue to be provided with hydrogen.

Figure 3:
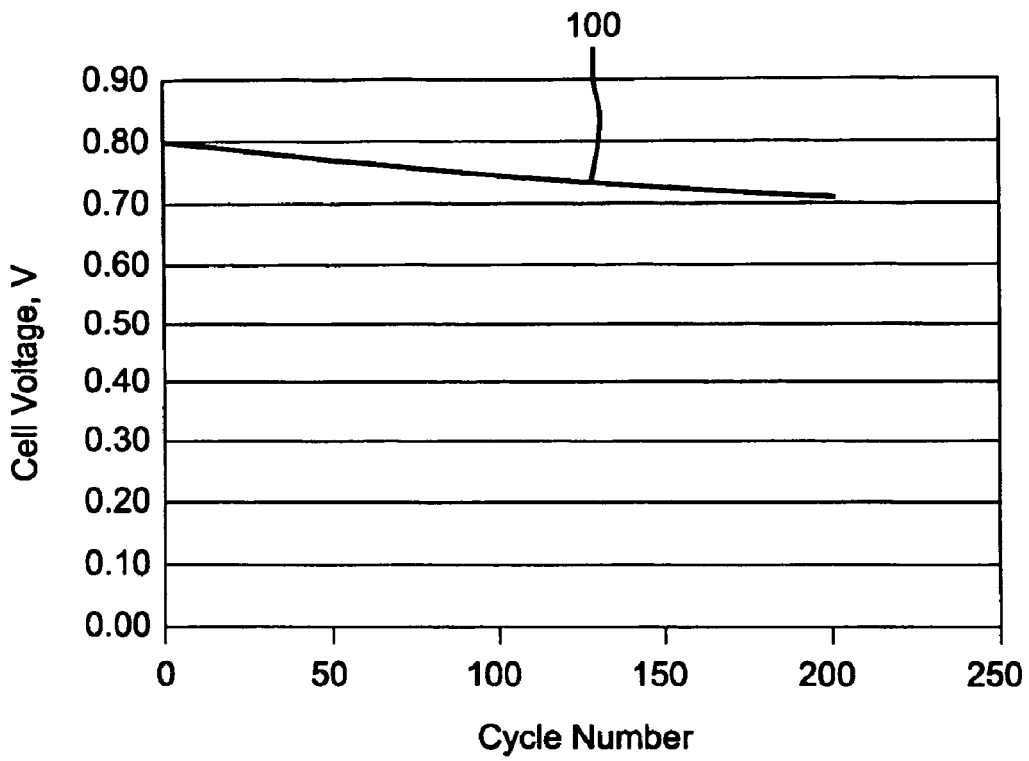
FIG. 3 is a graph illustrating the effect of prior art start-up and shutdown procedures on fuel cell degradation.
Figure 4:
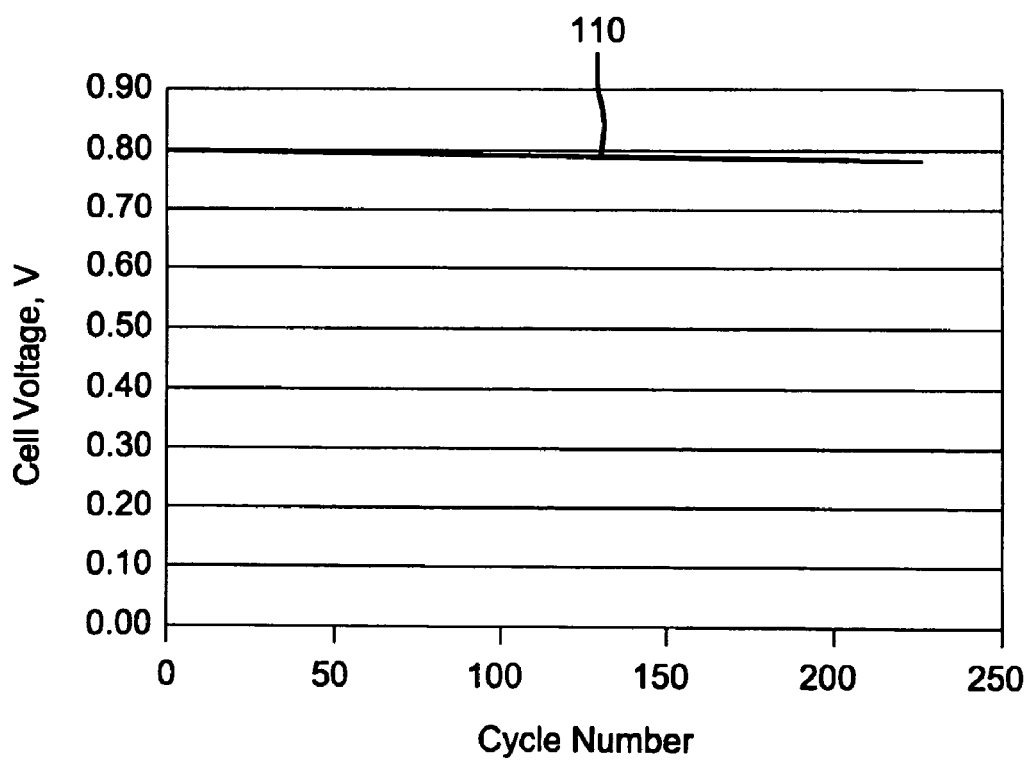
FIG. 4 is a graph illustrating the effect of the shutdown and start-up procedure of the present invention on fuel cell degradation.

With reference to FIG. 4, the effect on fuel cell degradation of the start-up and shutdown procedure, according to the principles of the present invention, will now be described. As illustrated, the cell voltage V represented by line 110 reduces a very small amount from approximately 0.79 to approximately 0.78 volts after 200 cycles. Thus, in comparison with the cell degradation that is illustrated in FIG. 3 which represents the prior art shutdown and start-up methods, the shutdown and start-up method of the present invention greatly improves the cell degradation.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A method of fuel cell start-up for a fuel cell including at least one membrane having cathode passages on one side thereof and anode passages on a second side thereof, the method for start-up comprising:

simultaneously introducing H₂ gas from a H₂ source into both said anode and cathode passages to consume/purge O₂ in both the anode and cathode passages;

then introducing a cathode gas into said cathode passages.

2. The method according to claim 1, wherein introduction of H₂ gas into said anode and cathode passages includes introducing approximately 2-5 times a stoichiometry of H₂ required to consume O₂ in the cathode passages.

* * * * *